(12) United States Patent
McAmish et al.

(10) Patent No.: US 6,811,643 B2
(45) Date of Patent: Nov. 2, 2004

(54) FILM, LAMINATED SHEET AND METHODS OF MAKING SAME

(75) Inventors: Larry Hughey McAmish, Cincinnati, OH (US); Kenneth L. Lilly, Lebanon, OH (US)

(73) Assignee: Clopay Plastic Products Company, Inc., Mason, OH (US)

(*) Notice: Subject to any disclaimer, the term of this patent is extended or adjusted under 35 U.S.C. 154(b) by 0 days.

(21) Appl. No.: 10/373,256

(22) Filed: Feb. 24, 2003

(65) Prior Publication Data

US 2003/0213549 A1 Nov. 20, 2003

Related U.S. Application Data

(60) Provisional application No. 60/358,871, filed on Feb. 22, 2002.

(51) Int. Cl.[7] ............................ B29C 47/06; B29C 55/02
(52) U.S. Cl. ................ 156/229; 156/244.24; 156/494; 264/210.7; 264/288.4
(58) Field of Search .......................... 156/229, 244.24, 156/324, 494, 244.27, 160, 163, 219, 220, 223, 164, 244.11; 264/171.13, 282, 210.6, 288.4, 210.7, 288.8, 210.2

(56) References Cited

U.S. PATENT DOCUMENTS

| | | |
|---|---|---|
| 3,870,593 A | 3/1975 | Elton et al. |
| 4,153,751 A | 5/1979 | Schwarz |
| 4,223,059 A | 9/1980 | Schwarz |
| 4,350,655 A | 9/1982 | Hoge |
| 4,353,945 A | 10/1982 | Sampson |
| 5,196,247 A | 3/1993 | Wu et al. |
| 5,202,173 A | 4/1993 | Wu et al. |
| 5,254,111 A | 10/1993 | Cancio et al. |
| 5,382,461 A | 1/1995 | Wu |
| 5,407,979 A | 4/1995 | Wu et al. |
| 5,422,172 A | 6/1995 | Wu |
| 5,592,690 A | 1/1997 | Wu |
| 5,851,937 A | 12/1998 | Wu et al. |
| 5,861,074 A | 1/1999 | Wu |
| 5,865,926 A | 2/1999 | Wu et al. |
| 5,910,225 A | 6/1999 | McAmish et al. |
| 6,013,151 A | 1/2000 | Wu et al. |
| 6,258,308 B1 | 7/2001 | Brady et al. |
| 6,265,045 B1 | 7/2001 | Mushaben |
| 2002/0074691 A1 | 6/2002 | Mortellite et al. |
| 2002/0112809 A1 | 8/2002 | Mortellite et al. |
| 2003/0005999 A1 | 1/2003 | Wu et al. |
| 2003/0024625 A1 | 2/2003 | McAmish et al. |
| 2003/0035943 A1 | 2/2003 | Jones et al. |

FOREIGN PATENT DOCUMENTS

GB  2285408 A  7/1995

*Primary Examiner*—Sue A. Purvis
(74) *Attorney, Agent, or Firm*—Dinsmore & Shohl LLP

(57) ABSTRACT

A method of making a microporous laminate sheet having a first film layer and a second layer. The first film layer includes a pore initiator and is bonded to the second layer in order to form a laminate sheet. The laminate sheet is then stretched using at least one CD intermeshing stretcher and at least one MDO stretching unit. Methods of making a microporous film is well as a microporous film laminate are also provided, along with an apparatus for stretching a film or laminate.

24 Claims, 10 Drawing Sheets

CD Intermeshing only @ 2000X

MDO only @ 2000X

CD & MD Intermesh @ 2000X

CD Intermeshing + MDO @ 2000x

3B MDO only. Surface @ 1000 X

3B MDO only. Cross-Section @ 2000X

3C CD Intermeshed & MDO. Surface @ 1000X

3C CD Intermeshed & MDO. Cross-Section @ 2000X

FILM, LAMINATED SHEET AND METHODS OF MAKING SAME

CROSS-REFERENCE TO RELATED APPLICATION

This Application claims the benefit under 35 U.S.C. § 119 of U.S. Provisional Application Ser. No.: 60/358,871, filed Feb. 22, 2002.

BACKGROUND OF THE INVENTION

Processes for the production of microporous films are well known in the art. For example, U.S. Pat. No. 3,870,593 (which is incorporated herein by reference) describes a process wherein a microporous film is produced by: (1) dispersing finely divided particles of a non-hygroscopic inorganic salt such as calcium carbonate in a polymer; (2) forming a film from the polymer; and (3) stretching the film to provide microporosity. Such microporous films are used for a variety purposes, such as breathable barriers (e.g., in diapers).

Although there are numerous prior art references which disclose microporous films, most (such as U.S. Pat. No. 4,353,945) do not define the stretching process other than to specify unidirectional or biaxial stretching. The three most common stretching techniques are MDO (machine direction orientation), tenter ovens, and intermeshing ring rolls (also called interdigitating rollers). MDO stretching units were available in the early days of microporous film from vendors such as Marshall & Williams, Inc. of Providence, R.I. Typical MDO stretching units have heated rolls and nips, with downstream rolls running at a faster speed in order to provide stretching in the machine direction only.

Tenter ovens were also available from several vendors, including Marshall & Williams. Tenter ovens function by grasping the edges of a film passing through a heated oven and stretching the film in a cross-machine direction. Films stretched in the cross-direction exit the oven substantially wider than their original width.

Intermeshing or interdigitating stretching devices were produced during this early period by vendors such as Biax-Fiberfilm of Neenah, Wis. U.S. Pat. No. 4,153,751, for example, describes the use of interdigitating rollers having grooves which extend substantially parallel to the axis of the rollers in order to stretch films in the cross-machine direction.

Methods of making composites of a microporous film and a nonwoven fabric are also known in the art. A microporous film may be bonded directly to the fabric by a variety of means, including adhesive, thermal, and/or ultrasonic bonding. As further discussed below, such composites have also been prepared by extrusion-coating a polymer extrudate onto a nonwoven fabric and then rendering the film microporous (such as by stretching).

It may also be desirable to stretch microporous film/fabric composites, however, stretching has its drawbacks. For instance, for microporous films, typical positive effects of stretching include higher vapor breathability and improved surface aesthetics. Vapor breathability (also referred to as water vapor transmission rate, "WVTR") can be estimated by laboratory test methods, and Is a function of the size and frequency of the micropores in the film. Additional stretching of an already microporous film is known to increase the size of existing pores and create new pores. Therefore, highly stretched microporous films and microporous film/fabric composites generally have higher vapor breathability as compared to similar materials which have been stretched to a lesser degree.

Likewise, surface feel and drapability are known to be improved by stretching. Film/fabric composites tend to be more stiff and harsh than either of the individual components alone. Stretching such composites tends to break down the rigid structure, thereby providing a softer surface feel and improved drapability.

On the other hand, stretching microporous film/fabric composites can result in decreased bond strength and increased pinholing. Stretching improves the softness and drapability by destroying the connection between film and fabric. This results in decreased bond strength in the laminate. Stretching can also cause undesirable damage to the laminate, such as pinholing, tearing, or shredding of the film, the fabric, or the composite as a whole.

Rather than bonding a microporous film to a fabric, it is also possible to first bond a non-porous film to a fabric, and then stretch the resulting composite in order to render the film microporous. For example, U.S. Pat. No. 5,865,926 describes a method wherein the film/nonwoven composite is incrementally stretched. U.S. Pat. No. 5,910,225 (which is incorporated herein by reference) uses MDO stretching and/or tenter oven stretching. In some instances, the prior art methods have been only partially successful due to damage to the composite caused by the stretching process. Damage includes, but is not limited to, pinholes, tears, and other functional and aesthetic defects.

Similarly, U.S. Pat. No. 6,013,151 (which is incorporated herein by reference) teaches that a film/nonwoven fabric laminate can be made microporous and breathable upon incremental stretching at high speeds. The resulting microporous laminates have a high water vapor transmission rate (WVTR). It has also been found that a flat film/nonwoven laminate can be incrementally stretched more uniformly than an embossed film/nonwoven laminate. More uniform stretching provides higher WVTR and fewer pinholes.

The bonding of a film and fabric also may be carefully controlled to avoid creating other functional and aesthetic problems. For example, in the case of extrusion coating a polyethylene extrudate onto a spunbond polypropylene web, process conditions such as melt temperature and nip pressure determine the intrusion of the fibers into the film structure. At the minimum level of intrusion, however, the film and fabric have little or no bond, and therefore tend to delaminate. At the maximum level of intrusion, on the other hand, the film and fabric essentially mold together and become one. Such a laminate, however, acquires the worst properties of the two individual components and tends to be both rigid and fragile. Too much bond strength is also known to limit the amount of stretching which may be performed without the risk of forming pinholes. Simply stated, if the bond between film and fabric is too large, the stretched film will sometimes fracture prior to delaminating, leaving a pinhole.

There is a continuing need for improvements in the performance and appearance of microporous films and composites of microporous films and nonwoven fabrics. In particular, improvements are desired for producing microporous films and microporous film/fabric composites having higher breathability, while avoiding pinholes and other functional and aesthetic defects.

SUMMARY OF THE INVENTION

One embodiment of the present invention provides a method of making a microporous laminate sheet comprising a first film layer and a second layer. The method comprises:

(a) bonding a first film layer to a second layer in order to form a laminate sheet, wherein the first film layer includes a pore initiator; and (b) stretching the laminate sheet using at least one CD intermeshing stretcher and at least one MDO stretching unit.

In one embodiment, the second layer comprises a fabric layer, whereas in another embodiment the second layer comprises another film layer which includes a pore initiator. In a particular embodiment of this method, the laminate sheet may be stretched by at least one CD intermeshing stretcher either immediately before or immediately after being stretched by at least one MDO stretching unit. The engagement depth of the CD intermeshing stretcher may be from about 0.025 to about 0.1 inches and the MDO stretch ratio may be between about 1.1:1 and about 4:1.

The film layer may be formed from a thermoplastic composition. When the second layer is a fabric, the step of bonding the film layer to the fabric layer may comprise extruding the thermoplastic composition onto said fabric layer. For example, the thermoplastic composition may be extruded into a cast roll nip station along with the fabric layer, wherein the cast roll nip station includes a pair of rollers having a nip therebetween.

The thermoplastic composition may be polyolefin based and comprise:

at least one polypropylene, polyethylene, or functionalized polyolefin; and calcium carbonate as a pore iniator.

One particular composition comprises:

one or more polyethylenes;

about 40% to about 60% calcium carbonate; and about 1% to 10% of one or more additives chosen from the group consisting of: pigments, processing aids, antioxidants, and polymeric modifiers.

The basis weight of the first film layer of the laminate may be between about 10 and about 40 gsm.

The fabric layer may be a polyolefin based nonwoven material. For example, the fabric layer may be chosen from the group consisting of: spunbond polypropylene; spunbond polyethylene; and carded, thermal bonded polypropylene. The basis weight of the fabric layer may be between about 10 and about 30 gsm, and the resulting laminate may have a water vapor transmission rate of greater than about 500 grams per square meter per day and a hydrohead in excess of about 60 cm.

Another embodiment of the present invention provides a method of making a microporous film, comprising the steps of:

(a) extruding a thermoplastic film from a polymer composition which includes a pore initiator; and (b) stretching the film using at least one CD intermeshing stretcher and at least one MDO stretching unit.

In a particular embodiment, the microporous film is stretched by at least one CD intermeshing stretcher either immediately before or immediately after being stretched by at least one MDO stretching unit.

Yet another embodiment of the present invention provides a method of making a microporous laminate sheet comprising at least two film layers, comprising the steps of:

(a) bonding a first film layer to a second film layer in order to form a laminate sheet, wherein the first film layer includes a pore initiator; and (b) stretching the laminate sheet using at least one CD intermeshing stretcher and at least one MDO stretching unit.

In a particular embodiment, each of the film layers is formed from a thermoplastic composition, and the step of bonding the first film layer to the second film layer comprises co-extruding said thermoplastic compositions.

The present invention also provides an apparatus for stretching a film or a film/fabric laminate, comprising a CD intermeshing stretcher and a MDO stretching unit, wherein the CD intermeshing stretcher and the MDO stretching unit are arranged such that a film or film/fabric laminate may be stretched by the CD intermeshing stretcher either immediately before or immediately after being stretched by the MDO stretching unit.

DETAILED DESCRIPTION OF THE INVENTION

Figure 1:
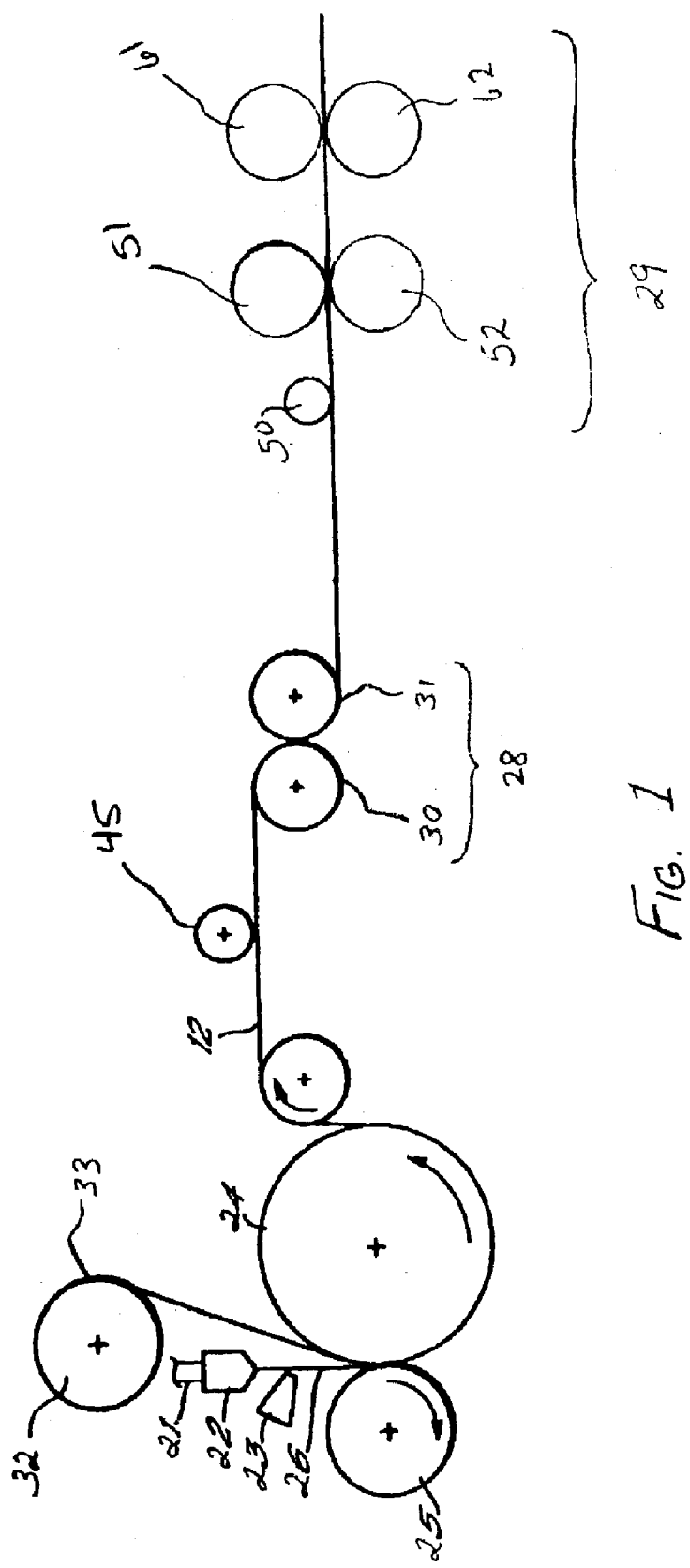
FIG. 1 is a schematic view of an apparatus for producing a laminate sheet according to one embodiment of the present invention.

The present invention provides a method of making microporous films which exhibit exceptional physical and aesthetic properties. These microporous films can comprise a single film layer, or may comprise a laminate of two or more film layers. Such film laminates may be formed, for example, by co-extrusion of two or more thermoplastic extrudates. The present invention also provides a method of making a laminated sheet comprising at least one microporous film layer and at least one fabric layer. Such laminated sheets may be made by bonding a microporous film to a fabric layer. Alternatively, a precursor film may be bonded to a fabric layer to form a laminate, and the laminate then stretched to provide microporosity in the film layer. Regardless of which technique is employed, the resulting laminated sheet having a microporous film layer and a fabric layer provides a breathable composite satisfactory for any of a variety of end uses, particularly those requiring a composite which will not delaminate, acts as a liquid barrier having high water vapor permeability, and/or is soft and cloth-like (such as for use in hygiene applications—e.g., diaper backsheets).

Applicants have found that, by proper selection of the stretching methods, microporous films and laminates having improved properties can be produced. In particular, by sequentially stretching the film or laminate with CD intermeshing ring rolls and an MDO unit, microporous films and laminates having unexpectedly improved properties are produced. Unless indicated otherwise, the term "laminate" refers to film laminates comprising two or more film layers, as well as film/fabric laminates comprising at least one film layer and at least one fabric layer.

In one embodiment, a film/fabric laminate is prepared and is then stretched to provide microporosity. A polymeric composition which can be activated to become microporous is extrusion coated onto a fabric and then stretched using the methods described herein to form a breathable composite satisfactory for many end uses, such as a liquid barrier having high water vapor permeability.

The most desirable property of a microporous, breathable film or laminate is the combination of high WVTR with a low incidence of pinholes. The optimum pore size distribution to attain this combination is a high frequency of small pores. Scanning electron microscope (SEM) analysis of film prototypes stretched only with a CD intermeshing unit (see FIG. 3) revealed pores which were located in specific locations along lanes running in the machine direction, due to the nature of the metal rollers physically contacting the film. When this film was later stretched via a MD intermeshing unit (see FIG. 5), the pores formed by the CD intermeshing unit were enlarged but few new pores were formed. Therefore, CD intermeshing followed by MD intermeshing is not the optimum process. However, when the film was processed by CD intermeshing followed by MDO stretching (see FIG. 6), the results were much improved. New pores were readily created in those lanes that contained no pores after only CD intermeshing. Since the film should generally be stretched until the desired WVTR is achieved, this CD intermeshing plus MDO technique is able to produce high WVTR by creating a larger number of smaller pores with less frequency of pinholes. If one were to attempt to achieve the same level of WVTR using only CD intermeshing or only MDO stretching, pinholing would be more frequent.

The methods of the present invention may be used to form microporous films (and film layers of laminates) from any suitable polymer (or mixture of polymers) which is capable of forming a film and which includes a pore initiator (such as an inorganic filler) dispersed therein. The polymer composition, having one or more pore initiators dispersed therein, is formed into a film, such as a continuous film formed by extrusion. The resulting film is then stretched using one or more cross machine (CD) intermeshing stretchers and one or more machine direction orientation (MDO) stretching units. In one embodiment, stretching by a CD intermeshing stretcher either immediately precedes, or immediately follows stretching by an MDO stretching unit. As used herein, the phrases "immediately precedes" and "immediately follows" simply mean that no other stretching is performed between stretching by a CD intermeshing stretcher and stretching by an MDO stretching unit. It is contemplated that other types of stretching units may be employed either before or after this sequence, and it is also contemplated that the film may be stretched only by one or more CD intermeshing stretchers and one or more MDO stretching units.

Figure 4:
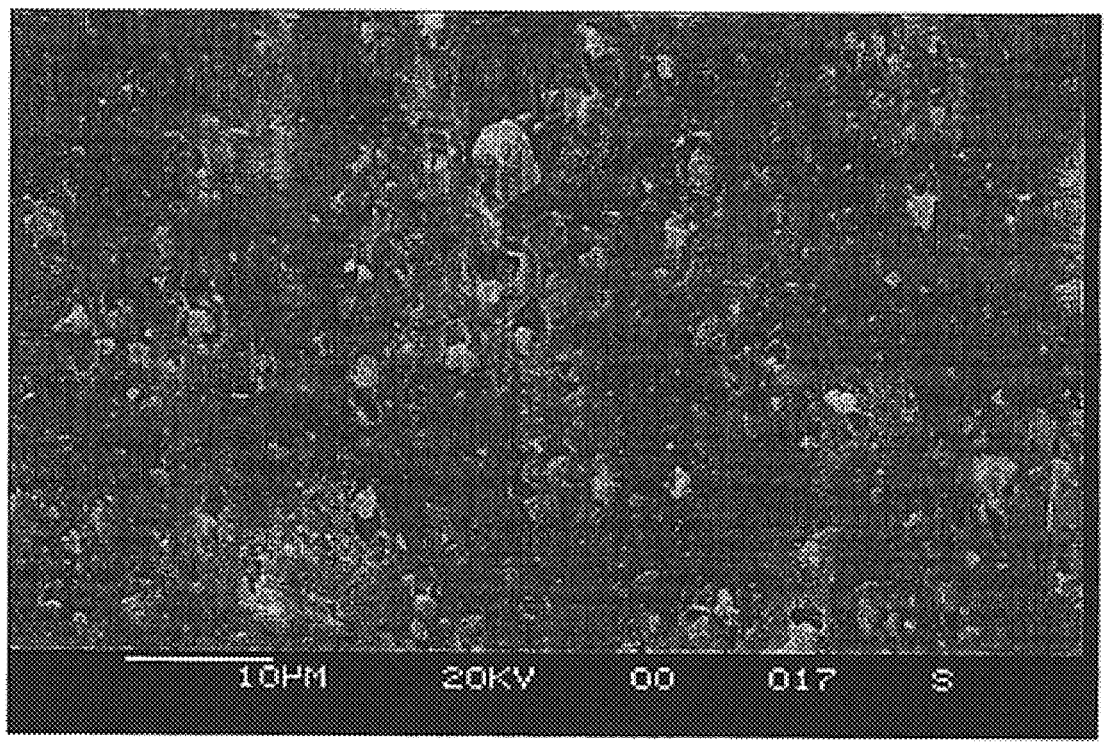
FIG. 4 is a SEM photomicrograph of a film stretched by an MDO stretching unit.
Figure 5:
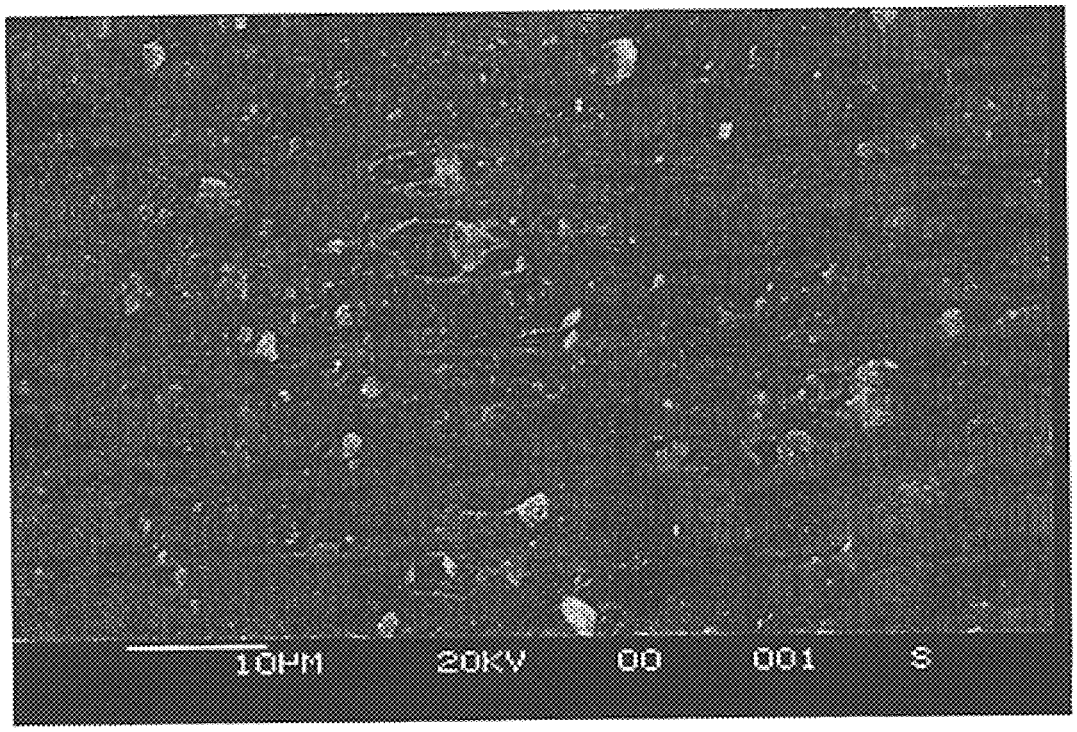
FIG. 5 is a SEM photomicrograph of a film stretched by CD intermeshing rollers, followed by MD intermeshing rollers.

By using CD intermeshing stretching in combination with MDO stretching, Applicants have found that the resulting micropores are more numerous, smaller and more uniform in size and shape (see FIG. 6) as compared to films stretched with a CD intermeshing stretcher alone (see FIG. 3), an MDO stretcher alone (see FIG. 4), or a CD intermeshing stretcher followed by a MD intermeshing stretcher (see FIG. 5).

In order to form a microporous film/fabric laminate, after the microporous film is prepared in the manner described above, the microporous film may be bonded to one or more fabric layers to form a laminate structure. Alternatively, a non-microporous film may first be bonded to one or more fabric layers to form a laminate structure, and this laminate structure may then be stretched in the manner described above in order to render the film layer microporous. The film and fabric layers may be bonded to one another by any of a variety of methods, such as adhesive bonding, electromagnetic bonding, hot plate bonding and ultrasonic bonding. In one embodiment, the film-forming polymer having one or more pore initiators dispersed therein may be extruded onto a fabric in order to form a laminate comprising a film layer bonded to a fabric layer. The resulting laminate sheet may then be stretched in the same manner as described above in order to render the film microporous. Even when extrusion coating is used to adhere the film to the fabric, bonding may be improved by the use of any of a variety of additional bonding methods, such as adhesive bonding, electromagnetic bonding, hot plate bonding and ultrasonic bonding. It should also be pointed out that the film/fabric laminates of the present invention may include any number of film and fabric layers, in any desired arrangement.

The same techniques used to form film/fabric laminates may also be used to form film laminates which comprise two or more film layers, wherein at least one of the film layers is microporous. Thus, a microporous film may be bonded to one or more other film layers to form a laminate structure. Alternatively, a non-microporous film may first be bonded to one or more other non-microporous film layers to form a laminate structure, and this laminate structure may then be stretched in the manner described above in order to render the film layers microporous. The film layers may be bonded to one another by any of a variety of methods, such as adhesive bonding, electromagnetic bonding, hot plate bonding and ultrasonic bonding. Film laminates may also be formed by co-extrusion. Film-forming polymer compositions having one or more pore initiators dispersed therein may be co-extruded in order to form a laminate comprising two or more film layers bonded to one another. The resulting laminate sheet may then be stretched in the same manner as described previously in order to render the film layers microporous.

The composition of each film layer in the film laminate may be selected in order to achieve desired properties for each film layer, and therefore the composition of each film layer may be the same or different. For example, one or more of the film layers may include a greater quantity of pore initiator such that more pores will be formed in that layer during stretching. In this manner, properties such as WVTR for each film layer in the resulting film laminate may be individually controlled. In one exemplary embodiment, a film laminate comprising three microporous layers may be formed, wherein the middle layer has a smaller amount of filler as compared to the two outer layers.

FIG. 1 is a schematic illustration of one embodiment of an apparatus which may be used to produce a laminate sheet in accordance with one embodiment of the present invention, wherein the film layer is a thermoplastic film and the fabric layer is a nonwoven fibrous web. Using the apparatus of FIG. 1, the thermoplastic film is laminated to the nonwoven fibrous web during extrusion by introducing the nonwoven web into the nip of a pair of rollers along with the thermoplastic extrudate. The resulting laminate sheet is then stretched in the manner described previously. If only a microporous film is desired rather than a laminate, the web of nonwoven fabric 33 on roller 32 may be eliminated. Likewise, if a film laminate is desired, multiple thermoplastic extrudates may be introduced into the nip of the pair of rollers, thus providing a co-extruded film laminate.

In order to produce a continuous laminate sheet, the thermoplastic composition of the film layer is fed from an extruder 21 through slot die 22 to form the extrudate 26 (which corresponds to the film layer of the resulting laminate sheet). Extrudate 26 is fed into the nip ("cast station nip") between a cast roll 24 (typically a metal roll) and a backup roll 25 (typically a rubber roll). An air knife 23 may be used to assist in the elimination of draw resonance, as described in, for example, U.S. Pat. No. 4,626,574. Alternatively, the air cooling devices described in U.S. Patent Application Ser. No. 09/489,095 (filed Jan. 20, 2000) may be employed to prevent draw resonance. A web of nonwoven fabric 33 from roller 32 is pulled into the cast station nip between rolls 25 and 24. In this nip, fabric 33 is extrusion coated with the molten film (or extrudate) 26 which has just exited the slot die 22. In essence, the fibers are embedded in, and encapsulated by the film during the extrusion lamination process.

After the laminate sheet leaves the nip between rolls 24 and 25, the laminate sheet is then stretched at two or more stretching stations. In one embodiment, the laminate sheet is stretched using one or more CD intermeshing stretchers and one or more MDO stretching units, wherein the sheet is stretched by one of the CD intermeshing stretchers immediately prior to or immediately after being stretched by one of the MDO stretching units. In addition, one or more temperature controlled rollers (such as roller 45) may be provided in order to heat the laminate prior to stretching.

Figure 2:
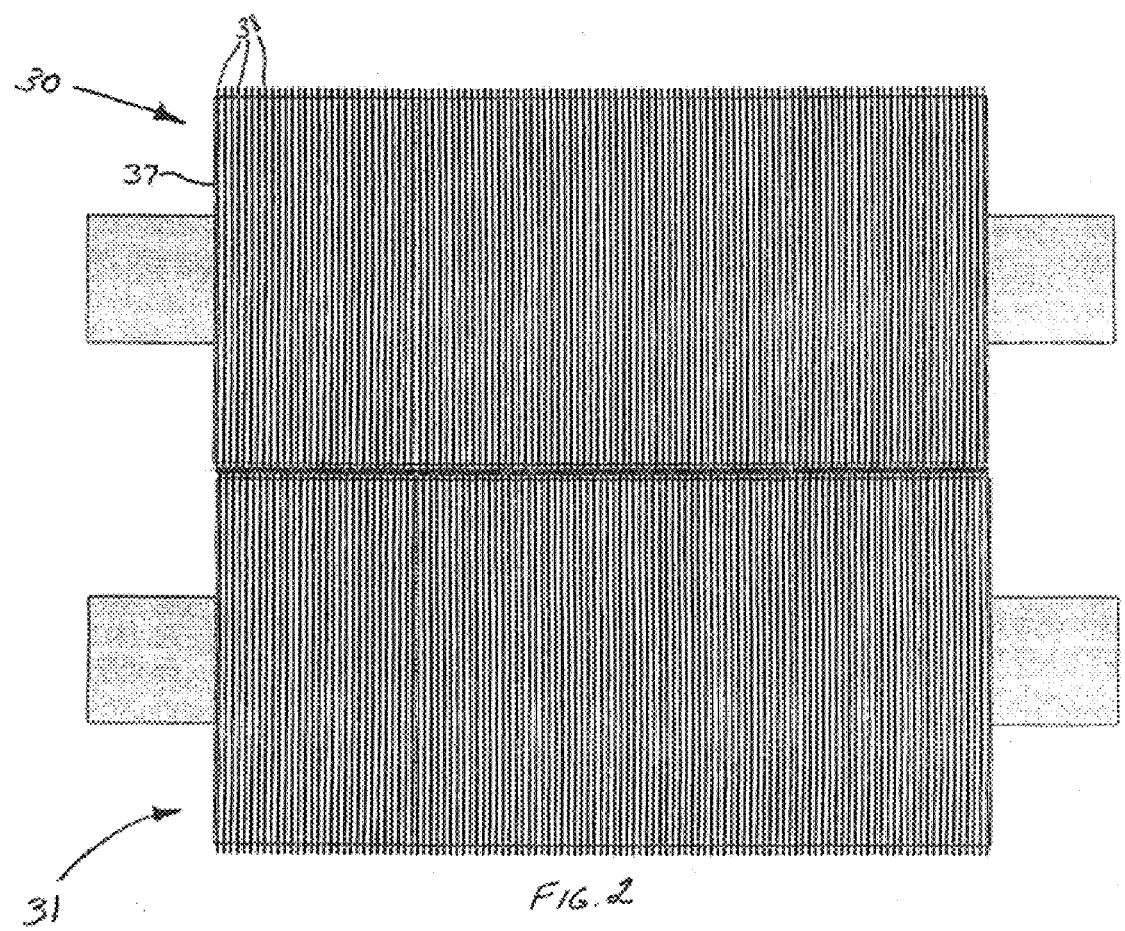
FIG. 2 is a schematic view of a pair of CD intermeshing ring rollers according to one embodiment of the present invention.

In the embodiment of FIG. 1, a CD intermeshing stretcher is provided at first stretching station 28, and a MDO stretching unit is provided at second stretching station 29. A CD intermeshing stretcher generally comprises a pair of rolls which are located so as to form a nip therebetween. Thus, the CD intermeshing stretcher at first stretching station 28 generally comprises incremental stretching rollers 30 and 31. While stretching rollers 30 and 31 may be of any of a variety of configurations, FIG. 2 is a schematic view of one exemplary embodiment of CD intermeshing ring rollers 30 and 31. Each ring roller has a plurality of grooves which extend around the surface of the roller, parallel to the circumference of the roller. When the rollers are brought together in close engagement, the grooves on one roller will intermesh with the grooves on the other roller. When a film or laminate is passed between the two rollers, the film or laminate will be incrementally stretched in the cross direction, as is known to those skilled in the art.

In the exemplary embodiment of FIG. 2, each incremental stretching roller (or "ring roller") essentially comprises a cylindrical roller 37 and a plurality of annular rings 38 secured to the outer circumference of cylindrical roller 37. Annular rings 38 are generally evenly spaced along the length of cylindrical roller 37. However, the rings on stretching roller 30 are offset from the rings on stretching roller 31 such that when the rings are brought together in the manner shown in FIG. 2, the rings (and grooves therebetween) of stretching roller 30 will be intermeshed with the rings (and grooves therebetween) of stretching roller 31. In this manner, as the laminate sheet is passed between stretching rollers 30 and 31, the laminate sheet will be incrementally stretched in the cross direction (i.e., perpendicular to the machine direction in the apparatus of FIG. 1).

In one exemplary embodiment, the shafts of the ring rollers may be disposed between two machine side plates, the lower shaft being located in fixed bearings and the upper shaft being located in bearings in vertically slidable members. The slidable members are adjustable in the vertical direction by wedge shaped elements operable by adjusting screws. Screwing the wedges out or in will move the vertically slidable member respectively down or up to further engage or disengage the gear-like teeth of the upper intermeshing roll with the lower intermeshing roll. Micrometers mounted to the side frames are operable to indicate the depth of engagement of the teeth of the intermeshing roll.

Air cylinders may be employed to hold the slidable members in their lower engaged position firmly against the adjusting wedges to oppose the upward force exerted by the material being stretched. These cylinders may also be retracted to disengage the upper and lower intermeshing rolls from each other for purposes of threading material through the intermeshing equipment or in conjunction with a safety circuit which would open all the machine nip points when activated.

Since the CD intermeshing elements are often capable of large engagement depths, it may be necessary for the equipment to incorporate a means of causing the shafts of the two intermeshing rolls to remain parallel when the top shaft is raising or lowering. This may be necessary to assure that the teeth of one intermeshing roll always fall between the teeth of the other intermeshing roll and potentially damaging physical contact between intermeshing teeth is avoided. This parallel motion is assured by a rack and gear arrangement wherein a stationary gear rack is attached to each side frame in juxtaposition to the vertically slidable members. A shaft traverses the side frames and operates in a bearing in each of the vertically slidable members. A gear resides on each end of this shaft and operates in engagement with the racks to produce the desired parallel motion.

The drive for the CD intermeshing stretcher will generally operate both upper and lower intermeshing rolls, except in the case of intermeshing stretching of materials having a relatively high coefficient of friction. The drive need not be antibacklash, however, because a small amount of machine direction misalignment or drive slippage will cause no problem. The reason for this will become evident with a description of the CD intermeshing elements.

In the exemplary embodiment of FIG. 2, the CD intermeshing elements may be machined from a solid material but can best be described as an alternating stack of two different diameter disks. In one embodiment, the intermeshing disks would be 6" in diameter, 0.031" thick, and have a full radius on their edge. The spacer disks separating the intermeshing disks would be 5½" in diameter and 0.069" in thickness. Two rolls of this configuration would be able to be intermeshed up to 0.231" leaving 0.019" clearance for material on all sides, and this CD intermeshing element configuration would have a 0.100" pitch. Alternatively, the CD intermeshing rollers may comprise cylindrical rollers having a series of annular rings extending about the circumference of the rollers.

Although the CD intermeshing rolls described above are capable of greater engagement depths, the engagement depth may be advantageously selected to be between about 0.025 and about 0.1 inches, more advantageously between about 0.04 and about 0.075 inches. Such engagement depths may avoid damage to the film.

In the exemplary embodiment of FIG. 1, after passing through the CD intermeshing rollers, the film or composite moves through second stretching station 29 which includes a MDO stretching unit. Typical MDO stretching equipment known to those skilled in the art can be rather complicated but the principles are simple. Film or film/fabric composites are passed through the nips of two pairs of rollers. However, the second pair of rollers are rotated at a faster speed than the first pair of rollers such that the film or film/fabric composite will be pulled by the second pair of rollers and hence stretched in the machine direction.

In some roller assemblies of an MDO stretching unit, one or more of the rolls are heated to assist in the stretching process. Alternatively, a separate heated roll may be included and at least one of the roller assemblies may therefore comprise three rolls. In such an arrangement, the first roll is an internally heated roll which warms the film or composite prior to presentation to the nip. This heated first roll is not in physical contact with any other roll of the roller assembly. The second roll is coated with a resilient material such as rubber to allow nipping (i.e. physical contact) with the third roll, which is metal, without damage. Typically, only one of the two rolls in contact with one another is driven, such as the metal third roll. However the non-driven roll will rotate due to the contact between the two rolls. While both of the rolls may be driven in contact with one another, if desired, such an arrangement requires more precise speed control.

In the exemplary embodiment of FIG. 1, a MDO stretching unit is provided at second stretching station 29. The first roller assembly of the MDO stretching unit comprises a heated roll 50, a coated second roll 51, and a metal third roll 52 (which is driven). The film or composite is passed through the nip between rolls 51 and 52. The second roller assembly of the MDO stretching unit in FIG. 1 is similar to the first, however, the second roller assembly only comprises a coated roll 61 and a driven metal roll 62 (without an additional heated roll). The film or composite is passed through the nip between rolls 61 and 62.

During operation, both nips of the MDO stretching unit are closed. The film or composite is nipped between rolls 51 and 52 and between rolls 61 and 62. However, rolls 61 and 62 are driven at a faster circumferential speed than rolls 51 and 52, thereby causing the film or composite to be stretched in the air gap between the two nips. A typical air gap dimension is between about 0.005" and about 0.550", or between about 0.005" and about 0.050".

In an MDO stretching unit, the "MDO stretch ratio" is defined as the ratio of the velocity of the second pair of rolls to the velocity of the first pair of rolls. In the embodiment of FIG. 1, the MDO stretch ratio is the ratio of the velocity of roll 62 to the velocity of roll 52. In one embodiment, the MDO stretch ration may be advantageously selected to be between about 1.1:1 and about 4:1, more advantageously about 2:1. Such MDO stretch ratios may avoid damage to the film. After leaving the MDO stretcher unit, the film or composite will be longer and thinner than its initial dimensions.

The apparatus and methods of the present invention are particularly suited to producing laminate sheets comprising at least one microporous film layer and at least one fabric layer. The film composition which is extruded into the nip may include filler particles (a pore initiator) such that, when the laminate sheet is stretched, micropores will be formed in the film layer at the locations of the filler particles. The fabric layer may comprise, for example, a nonwoven fibrous web of staple fibers or spun-bonded filaments. In addition, the incremental stretching provided by the CD intermeshing stretch provides a very soft fibrous finish to the composite that looks like cloth. The result of such incremental or intermesh stretching is a composite that has excellent breathability and liquid-barrier properties, as well as soft cloth-like textures.

Materials for the Film and Composite

Processes for the production of microporous films are well known in the art. The film is produced by blending finely divided particles of an inorganic filler (such as calcium carbonate or other salt) into a suitable polymer, forming a film of the filled polymer, and stretching the film to provide microporosity and breathability.

A microporous film is often characterized by the size of the pores present. Pores with equivalent diameters in the range of 0.01 to 0.25 microns are known to prevent the flow of non-wetting liquids. If the frequency of these pores is sufficiently high, the material will allow a reasonable passage of water vapor while maintaining an effective barrier to liquid water.

According to one embodiment of the present invention, the film (including the film layer of a film/fabric composite and the individual film layers of a film laminate) may comprise a polyolefin-based composition, such as one or more polypropylenes, polyethylenes, functionalized polyolefins, or combinations thereof. One suitable composition comprises a blend of one or more polyethylenes (such as a blend of LLDPE and LDPE) and a pore initiator. The type and amount of each polyethylene employed will depend, in large part, upon the intended use of the film or laminate. In one embodiment, about 40% to about 60% of a pore initiator may be included. For example, one particular formulation for the film according to an embodiment of the present invention may be obtained by first melt blending a composition comprising:

(a) about 35% to about 45% by weight of a linear low density polyethylene ("LLDPE"), (b) about 3% to about 10% by weight of a low density polyethylene ("LDPE"), (c) about 40% to about 60% by weight calcium carbonate filler particles (such as calcium carbonate surface coated with a fatty acid), and (d) optionally, about 1% to about 10% by weight of one or more of the following additives: pigments, processing aids, antioxidants, and polymeric modifiers.

The above composition may be extruded into the nip between two rollers (such as rollers 24 and 25 described previously) in order to form a film at a speed of about 550 fpm to about 1200 fpm (or faster), without draw resonance. In one embodiment, the resulting film layer may have a basis weight of between about 10 and about 40 gsm (g/m$^2$), more particularly between about 20 and about 30 gsm. The resulting film may then be stretched in the manner described previously.

One particular film composition may comprise about 51% by weight polyethylene, and about 44% by weight calcium carbonate filler particles having an average particle size of about 1 micron. The polyethylene may be provided as a blend of LLDPE and LDPE, with the amount of each type dependent upon the intended use for the film or laminate, including the desired aesthetic and physical properties (including properties such as drapability and surface feel). In some instances, it may be desirable to include high density polyethylene in order to increase stiffness. The film color (whiteness) can be controlled by including one or more pigments. A white colored film, for example, and be provided by including up to about 4% by weight titanium dioxide. A processing aid such as a fluorocarbon polymer in an amount of about 0.1% to about 0.5% by weight may also be added, such as 1-propene,1,1,2,3,3,3-hexafluoro copolymer with 1,1-difluoroethylene. Antioxidants such as Irganox 1010 and Irgafos 168 may also be added at a total concentration of about 500 to about 4000 ppm.

Although the above-described film compositions may be used to form microporous films using the stretching methods described herein, composite structures may also be formed by bonding a film layer (such as those formed from the compositions described above) to a fabric layer or another film layer. The film layer may be rendered microporous by stretching prior to bonding to the fabric or additional film layer. Alternatively, an unstretched film layer of the compositions described above may be bonded to a fabric layer or another film layer and the resulting composite structure then stretched in order to render the film layer(s) microporous.

As yet another alternative, a fabric layer may be fed into the nip between two rollers (such as rollers 24 and 25 described previously) along with the extrudate. In this manner, the polymeric composition of the film layer is extruded onto the fabric layer. The resulting laminate sheet is then stretched in the same manner as described previously to provide a laminate sheet having a microporous film layer and a fabric layer. In one embodiment, the fabric layers of the various laminate structures described herein may have a basis weight of between about 10 and about 30 gsm, or even between about 15 and about 25 gsm. The WVTR of the laminate may be greater than about 500 grams per square meter per day and the hydrohead of the laminate may be in excess of about 60 cm (measured as the minimum height of a column of water that generates leakage in the laminate). In one embodiment, the WVTR may exceed about 1000 grams per square meter per day, or even exceed about 3000 grams per square meter per day.

Similarly, two or more extrudates may be fed into the nip between two rollers (such as rollers 24 and 25 described previously). In this manner, the polymeric compositions are co-extruded in order to form a laminate of two or more film layers. The resulting laminate sheet is then stretched in the same manner as described previously to provide a laminate sheet having two or more microporous film layers.

Suitable fabric layers include natural or synthetic fibers or filaments, which are bonded or otherwise consolidated into a web structure. Suitable fabrics include woven and non-woven fabrics such as spunmelt, spunlace, carded, thermal or adhesive bonded fabric webs. Exemplary fabrics which may be used include spunbond polypropylene, spunbond polyethylene, and carded, thermal bonded polypropylene.

Test Methods

The properties of films and laminate sheets produced according to the present invention may be tested in a variety of manners. For example, the water vapor transmission rate ("WVTR") may be determined in accordance with ASTM E 96, "Standard Test Methods for Water Vapor Transmission of Materials." A known amount of desiccant is put into a cup-like container along with the sample and held securely by a retaining ring and gasket. The assembly is placed in a constant temperature (40° C.) and humidity (75% RH) chamber for 5 hours. The amount of moisture absorbed by the desiccant is determined gravimetrically and used to estimate the WVTR (units of $g/m^2 \cdot 24$ hr) of the sample.

ASTM E 1294-89: "Standard Test Method for Pore Size Characteristics of Membrane Filters using Automated Liquid Porosimeter" may be used to measure the maximum pore size (MPS). This method measures the MPS (units of microns) for microporous films and laminate sheets using a liquid displacement technique that depends on the capillary rise created by the surface tension and uses the Washburn equation for calculating the pore diameter.

The number of pinholes may be determined using the Clopay Pinhole Test Method (HCTM-02) which measures the resistance of coated and laminated fabrics to the penetration of an alcohol solution (100 ml of 70% Isopropyl alcohol with 1.0 ml of red food color dye). This test is conducted by exposing approximately six square feet of composite to 72 ml of the solution onto the film side of the sample. The solution is evenly spread with a brush to cover the marked off area of the sample. The solution is allowed to rest for ten minutes, then patted dry with napkins. The sample is turned over and the dye marks are counted. The number of pinholes in the tested area are reported.

EXAMPLES

The following examples illustrate one method of making films, film laminates and film/fabric laminates according to one embodiment of the present invention. In light of these examples and this further detailed description, it will be apparent to a person of ordinary skill in the art that variations thereof may be made without departing from the scope of this invention. The listing of these examples is provided merely to show one skilled in the art how to apply the principals of this invention as discussed herein. These examples are not intended to limit the scope of the claims appended to this invention.

In the following examples, an apparatus similar to that shown in FIG. 1 was employed. However, in Example 1, since only a microporous film was formed and not a laminate, the web of nonwoven fabric 33 on roller 32, as well as rolls 24 and 25 which form the cast station nip, were not employed.

Figure 3:
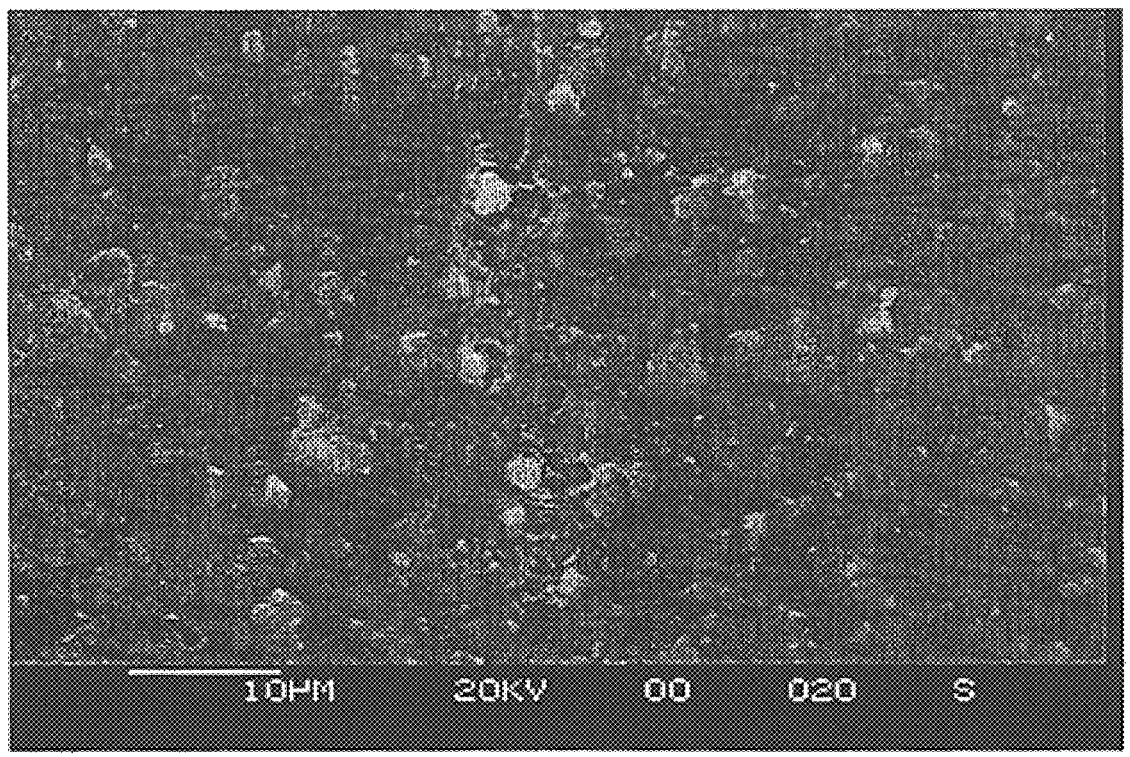
FIG. 3 is a SEM photomicrograph of a film stretched by CD intermeshing rollers.
Figure 6:
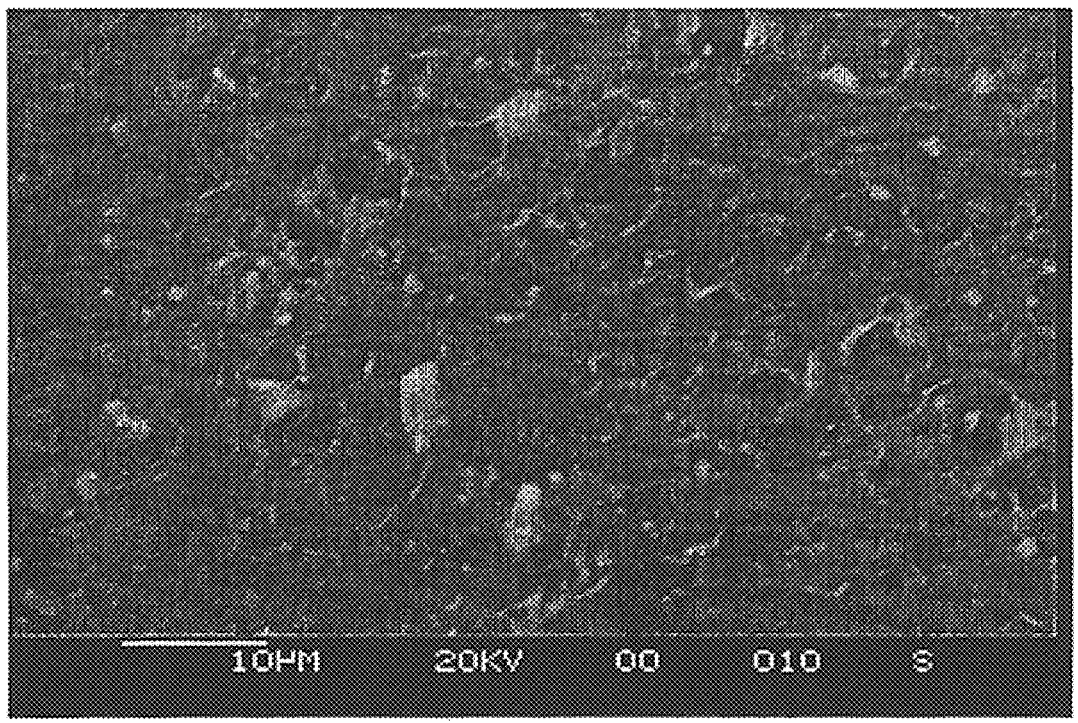
FIG. 6 is a SEM photomicrograph of a film stretched by CD intermeshing rollers, followed by an MDO stretching unit.

Example 1:

A film formulation containing 50% calcium carbonate, 47% polyethylene resin, and 3% titanium dioxide was extruded using standard cast film equipment and process conditions. The extruder speed and line speed were set so that a 45 g/m² film layer was produced. This was film 1A. Film 1B was created by passing film 1A through a pair of CD Intermeshing ring rollers. The ring rollers had rings every 0.100 inches. FIG. 3 is a photomicrograph of film 1B. Film 1C was created by passing film 1A through a MDO stretching unit only. FIG. 4 is a photomicrograph of film 1C. Film 1D was created by stretching film 1A with both the CD and MDO units. The final film thickness of 1D was such that the basis weight of the film was about 23 g/m² for an MDO stretch ratio of about 2:1. FIG. 6 is a photomicrograph of film 1D. For comparison, film 1A was also stretched with the CD Intermeshing unit and then an MD (machine direction) intermeshing unit, to create film 1E. FIG. 5 is a photomicrograph of film 1E.

The physical property results shown in Table #1 represent typical data for the above films at the engagement depth on the CD intermeshing rollers and the ratio of speeds in and out of the MDO unit specified above. As noted in the table, the properties of the film stretched by the CD intermeshing rollers followed by the MDO stretching unit are superior to any other option. The photomicrographs of FIGS. 3–6 also demonstrate that the stretching methods of the present invention provide a high number of small diameter, round pores which are responsible for the high MVTR (or WVTR) as compared to the other films. The "air flow" measurement reported in Table 1 was obtained by applying high pressure air to the film and measuring air flow through the film over a short period of time (five seconds).

TABLE 1

| Sample Description | Basis Weight (g/m²) | Pinhole Count (#/m²) | Air Flow (ml/min @ 90 psi) | MVTR (g/m²/day) |
|---|---|---|---|---|
| 1A - precursor | 45 | 0 | 0 | 100 |
| 1B - CD Int. only | 35 | 0 | 1128 | 1800 |
| 1C - MDO only | 25 | 0 | 1511 | 2500 |
| 1D - CD Int. & MDO | 31 | 0 | 6030 | 3400 |
| 1E - CD Int. & MD Int. | 23 | 0 | 4400 | 3000 |

Example 2

A film formulation containing 50% calcium carbonate, 47% polyethylene resin, and 3% titanium dioxide was extruded using standard cast film equipment and process conditions. A 20 g/m² thermal point bonded, carded, polypropylene web was threaded from the unwind into the cast station nip so that it contacted the molten film stream during run conditions. The extruder speed and line speed was set so that an 40 g/m² film layer was added to the fabric. This created Laminate 2A. The film/fabric laminate 2A was then passed through the CD Intermeshing ring rollers to make Laminate 2B. The ring rollers had rings every 0.100 inches. Laminate 2C was created by passing Laminate 2A through a MDO stretching unit only. Laminate 2D was created by stretching Laminate 2A with both the CD and MDO units. For comparison, Laminate 2A was also stretched with the CD Intermeshing unit and then the MD intermeshing unit, to create Laminate 2E. The physical property results shown in Table #2 represent typical data for these prototypes depending upon the engagement depth on the CD intermeshing rollers and the ratio of speeds in and out of the MDO unit. As noted in the table, the properties of the laminate stretched by the CD intermeshing rollers followed by the MDO stretching unit are superior to any other option.

TABLE 2

| Sample Description | Basis Weight (g/m²) | Pinhole Count (#/m²) | Air Flow (ml/min @ 90 psi) | MVTR (g/m²/day) |
|---|---|---|---|---|
| 2A - precursor | 60 | 0 | 0 | 50 |
| 2B - CD Int. only | 53 | 0 | 414 | 1100 |
| 2C - MDO only | 49 | 0 | 611 | 1200 |
| 2D - CD Int. & MDO | 46 | 0 | 1780 | 3169 |
| 2E - CD Int. & MD Int. | 51 | 0 | 872 | 1743 |

Example 3

Figure 7:
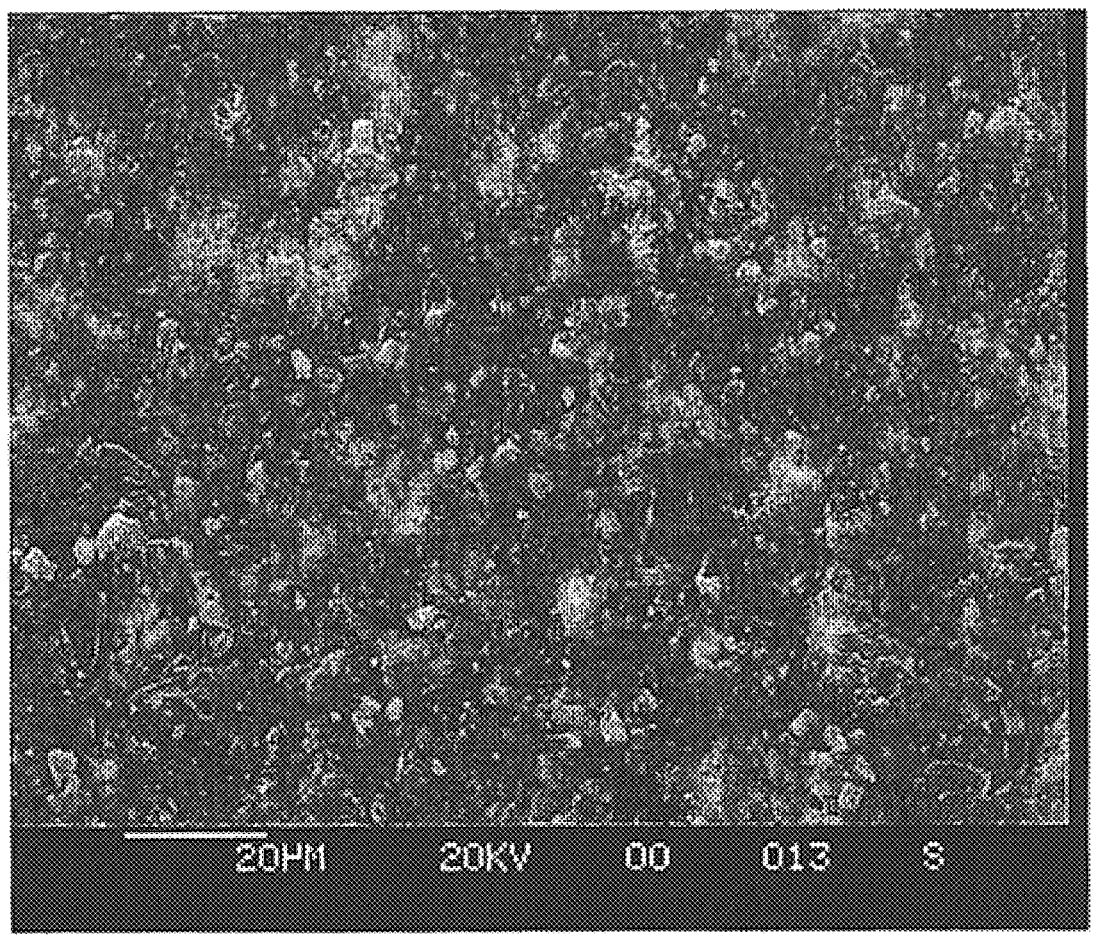
FIG. 7 is a SEM photomicrograph of the surface of an A/B/A film laminate stretched by an MDO unit.
Figure 8:
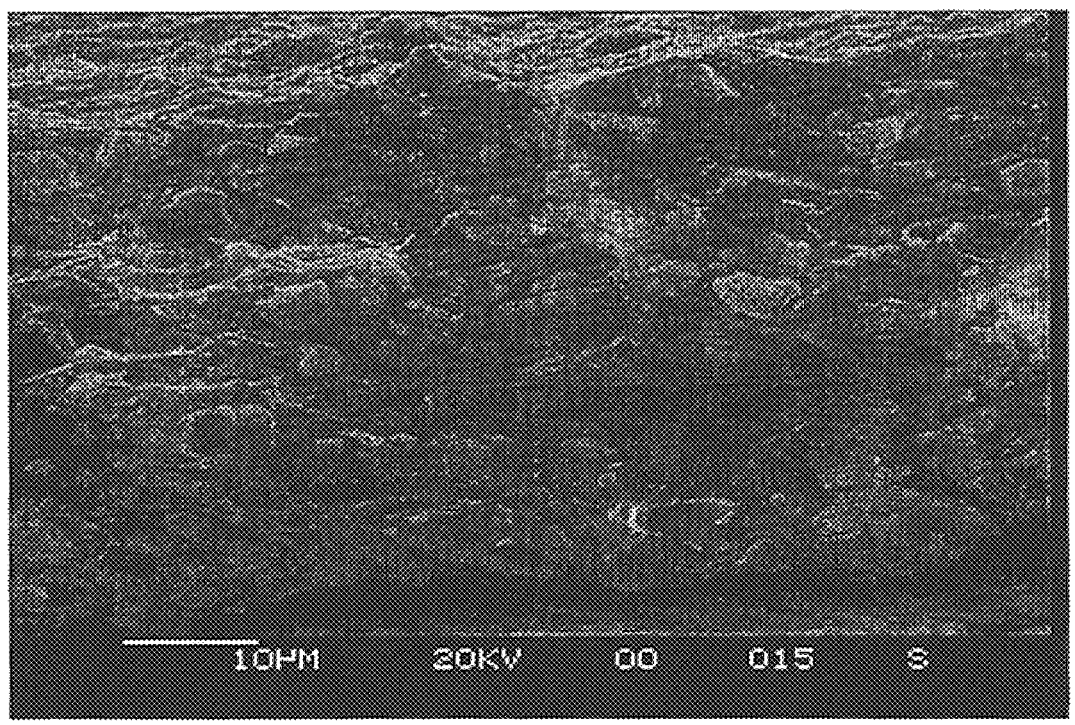
FIG. 8 is a SEM photomicrograph of the cross-section of an A/B/A film laminate stretched by an MDO unit.
Figure 9:
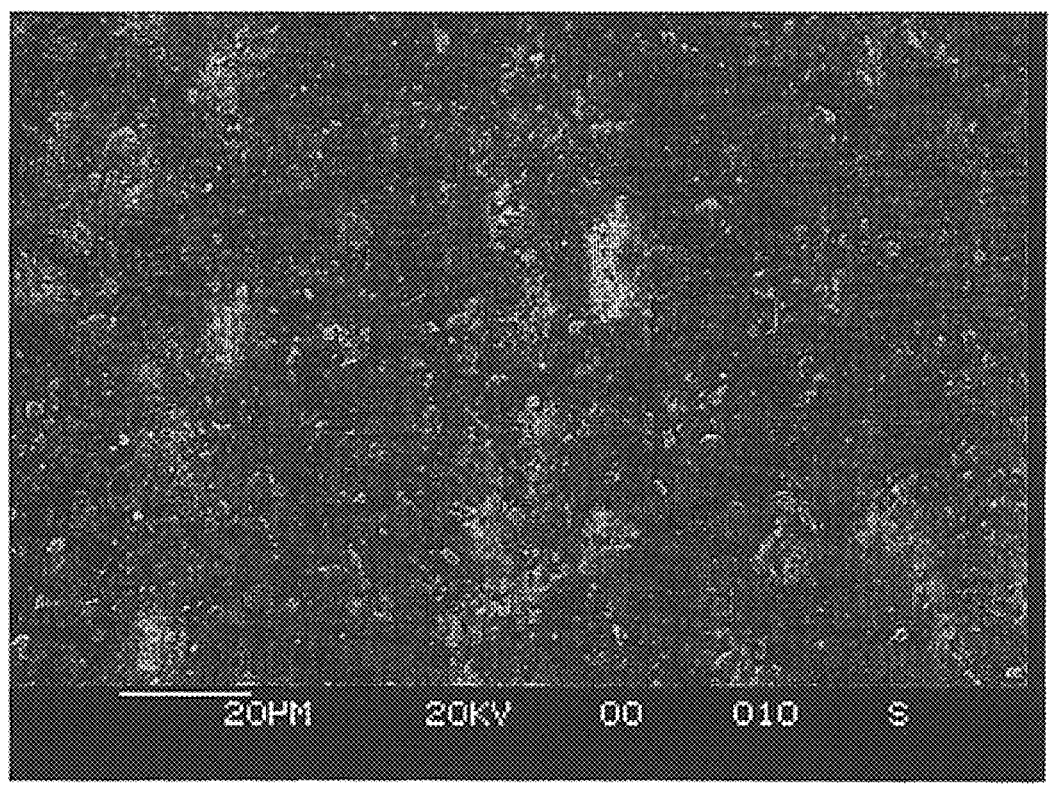
FIG. 9 is a SEM photomicrograph of the surface of an A/B/A film laminate stretched by CD intermeshing rollers, followed by an MDO stretching unit.
Figure 10:
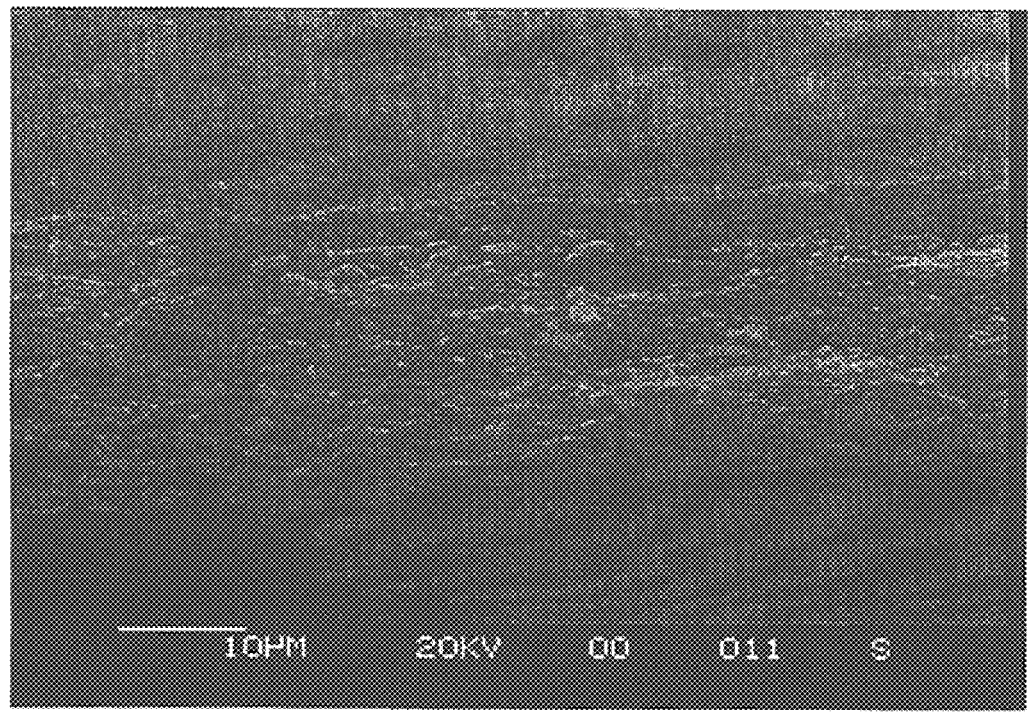
FIG. 10 is a SEM photomicrograph of the cross-section of an A/B/A film laminate stretched by CD intermeshing rollers, followed by an MDO stretching unit

Standard cast film equipment and process conditions were used to prepare a co-extruded film laminate comprising three film layers (A/B/A) and having a basis weight of 85 g/m². The polymeric composition for the first and third layers contained 57% calcium carbonate and 43% polyethylene resin, and had a basis weight of 30 g/m². The polymeric composition for the middle layer contained 54% calcium carbonate and 46% polyethylene resin, and had a basis weight of 25 g/m². None of the layers contained titanium dioxide. This was designated film 3A. Film 3B was created by passing film 3A through a MDO stretching unit only. MDO stretching was performed at 215 F., using a stretch ratio of 2.5 and a stretch gap of 5 mil. FIG. 7 is a photomicrograph of the surface of film 3B, and FIG. 8 is a photomicrograph of a cross-section of film 3B. Film 3C was created by stretching film #3A with a CD intermeshing unit followed by stretching with a MDO unit. CD intermesh stretching was performed at 75 F. using an engagement depth of 0.040". MDO stretching was performed at 215 F., using a stretch ratio of 2.0 and a stretch gap of 5 mil. FIG. 9 is a photomicrograph of the surface of film 3C, and FIG. 10 is a photomicrograph of a cross-section of film 3C.

The physical property results for films 3A, 3B and 3C are shown in Table #3. As noted in the table, the properties of the film stretched by the CD intermeshing rollers followed by the MDO stretching unit are superior to the film stretched only with an MDO unit. The photomicrographs of FIGS. 7–10 also demonstrate that the stretching methods of the present invention provide a high number of small diameter, round pores which are responsible for the high MVTR (or WVTR) as compared to the other films.

TABLE 3

| Sample Description | Basis Weight (g/m²) | Pinhole Count (#/m²) | MVTR (g/m²/day) |
|---|---|---|---|
| 3A - precursor | 85 | 0 | 50 |
| 3B - MDO only | 36 | 0 | 2850 |
| 3C - CD Int. & MDO | 33 | 0 | 9946 |

What we claim is:

1. A method of making a microporous laminate sheet comprising a first film layer and a second layer, comprising:
    (a) bonding a first film layer to a second layer in order to form a laminate sheet, wherein said first film layer includes a pore initiator; and
    (b) stretching said laminate sheet using at least one CD intermeshing stretcher and at least one MDO stretching unit.

2. The method of claim 1, wherein said second layer comprises a fabric layer.

3. The method of claim 2, wherein said film layer is formed from a thermoplastic composition, and said step of bonding the film layer to the fabric layer comprises extruding said thermoplastic composition onto said fabric layer.

4. The method of claim 3, wherein said thermoplastic composition is extruded into a cast roll nip station along with said fabric layer, wherein said cast roll nip station includes a pair of rollers having a nip therebetween.

5. The method of claim 3, wherein said thermoplastic composition is polyolefin based and comprises:
    at least one polypropylene, polyethylene, or functionalized polyolefin; and
    calcium carbonate as a pore iniator.

6. The method of claim 3, wherein said thermoplastic composition is polyolefin based, and comprises:
    one or more polyethylenes;
    about 40% to about 60% calcium carbonate; and
    about 1% to 10% of one or more additives chosen from the group consisting of: pigments, processing aids, antioxidants, and polymeric modifiers.

7. The method of claim 2, wherein said fabric layer is a polyolefin based nonwoven material.

8. The method of claim 2, wherein said fabric layer is chosen from the group consisting of: spunbond polypropylene; spunbond polyethylene; and carded, thermal bonded polypropylene.

9. The method of claim 8, wherein the basis weight of the fabric layer is between about 10 and about 30 gsm.

10. The method of claim 2, wherein said laminate has a water vapor transmission rate of greater than about 500 grams per square meter per day and a hydrohead in excess of about 60 cm.

11. The method of claim 1, wherein said second layer comprises another film layer which includes a pore initiator.

12. The method of claim 1, wherein the laminate sheet is stretched by at least one CD intermeshing stretcher either immediately before or immediately after being stretched by at least one MDO stretching unit.

13. The method of claim 1, wherein the engagement depth of the CD intermeshing stretcher is from about 0.025 to about 0.1 inches and the MDO stretch ratio is between about 1.1:1 and about 4:1.

14. The method of claim 1, wherein the basis weight of the first film layer of the laminate is between about 10 and about 40 gsm.

15. A method of making a microporous film, comprising:
   (a) extruding a thermoplastic film from a polymer composition which includes a pore initiator; and
   (b) stretching said film using at least one CD intermeshing stretcher and at least one MDO stretching unit.

16. The method of claim 15, wherein the microporous film is stretched by at least one CD intermeshing stretcher either immediately before or immediately after being stretched by at least one MDO stretching unit.

17. The method of claim 15, wherein the engagement depth of the CD intermeshing stretcher is from about 0.025 to about 0.1 inches and the MDO stretch ratio is between about 1.1:1 and about 4:1.

18. The method of claim 15, wherein said polymer composition is polyolefin based and comprises:
   at least one polypropylene, polyethylene, or functionalized polyolefin; and
   calcium carbonate as a pore iniator.

19. The method of claim 15, wherein said polymer composition is polyolefin based, and comprises:
   one or more polyethylenes;
   about 40% to about 60% calcium carbonate; and
   about 1% to 10% of one or more additives chosen from the group consisting of: pigments, processing aids, antioxidants, and polymeric modifiers.

20. The method of claim 15 wherein the basis weight of the film layer of the laminate is between about 10 and about 40 gsm.

21. A method of making a microporous laminate sheet comprising at least two film layers, comprising:
   (a) bonding a first film layer to a second film layer in order to form a laminate sheet, wherein said first film layer includes a pore initiator; and
   (b) stretching said laminate sheet using at least one CD intermeshing stretcher and at least one MDO stretching unit.

22. The method of claim 21 wherein each of said film layers is formed from a thermoplastic composition, and said step of bonding the first film layer to the second film layer comprises co-extruding said thermoplastic compositions.

23. The method of claim 22, wherein each of said thermoplastic compositions is polyolefin based, and comprises:
   at least one polypropylene, polyethylene, or functionalized polyolefin; and
   calcium carbonate as a pore initiator.

24. An apparatus for stretching a film or a film/fabric laminate, comprising a CD intermeshing stretcher and a MDO stretching unit, wherein said CD intermeshing stretcher and said MDO stretching unit are arranged such that a film or film/fabric laminate may be stretched by said CD intermeshing stretcher either immediately before or immediately after being stretched by said MDO stretching unit.

* * * * *